United States Patent
Covolato et al.

(10) Patent No.: US 11,681,784 B2
(45) Date of Patent: Jun. 20, 2023

(54) HARDWARE LICENSE VERIFICATION

(71) Applicant: Arista Networks, Inc., Santa Clara, CA (US)

(72) Inventors: Baptiste Elie Franck Covolato, Vancouver (CA); Dipankar Bhatt Acharya, Saratoga, CA (US); Ethan Barnett Rahn, Agoura Hills, CA (US); Gil Adrian Torres, San Francisco, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 371 days.

(21) Appl. No.: 17/011,210

(22) Filed: Sep. 3, 2020

(65) Prior Publication Data
US 2022/0067127 A1 Mar. 3, 2022

(51) Int. Cl.
*G06F 21/10* (2013.01)
*G06F 21/64* (2013.01)
*G06F 21/60* (2013.01)
*G06F 21/73* (2013.01)

(52) U.S. Cl.
CPC .......... *G06F 21/105* (2013.01); *G06F 21/602* (2013.01); *G06F 21/64* (2013.01); *G06F 21/73* (2013.01); *G06F 2221/0753* (2013.01); *G06F 2221/0757* (2013.01)

(58) Field of Classification Search
CPC ...... G06F 21/105; G06F 21/602; G06F 21/64; G06F 21/73; G06F 2221/0753; G06F 2221/0757; G06F 21/12; G06F 21/57; G06F 21/44
See application file for complete search history.

(56) References Cited

U.S. PATENT DOCUMENTS

| | | | |
|---|---|---|---|
| 7,680,742 B1* | 3/2010 | Ackerman | G06Q 30/00 717/177 |
| 9,558,522 B2* | 1/2017 | Walker | G06Q 50/184 |
| 11,184,157 B1* | 11/2021 | Gueron | H04L 9/14 |
| 2003/0134675 A1* | 7/2003 | Oberberger | G06F 21/10 463/29 |
| 2007/0014414 A1* | 1/2007 | Benedikt | G06F 21/10 380/278 |

(Continued)

OTHER PUBLICATIONS

Zhang et al., A Pragmatic Per-Device Licensing Scheme for Hardware IP Cores on SRAM-Based FPGAs, IEEE, 2014.*

*Primary Examiner* — David Garcia Cervetti
(74) *Attorney, Agent, or Firm* — Fountainhead Law Group P.C.

(57) ABSTRACT

Verifying a hardware license and controlling hardware features includes receiving a first part of a license payload and a license signature covering the license payload from a CPU, the license signature being generated using a private encryption key; receiving a second part of the license payload from a memory, the CPU being unable to modify the second part of the license payload; generating a hash using the first part and the second part of the license payload; and verifying the license signature using the hash and a public encryption key associated with the private encryption key. When the verifying is successful, communicating with circuitry to enable functionality of the circuitry specified in the license payload.

20 Claims, 11 Drawing Sheets

(56) References Cited

U.S. PATENT DOCUMENTS

| | | | | |
|---|---|---|---|---|
| 2008/0005033 A1* | 1/2008 | Clark | G06F 21/121 | 705/59 |
| 2008/0130893 A1* | 6/2008 | Ibrahim | G06F 21/572 | 380/277 |
| 2009/0204821 A1* | 8/2009 | Fransson | G06F 3/03545 | 713/189 |
| 2009/0282399 A1* | 11/2009 | Kamrowski | G06F 8/658 | 711/E12.008 |
| 2010/0319072 A1* | 12/2010 | Abzarian | G06F 21/10 | 726/31 |
| 2011/0061047 A1* | 3/2011 | Tyamagondlu | G06F 21/105 | 717/177 |
| 2012/0130900 A1* | 5/2012 | Tang | G06Q 30/00 | 705/59 |
| 2012/0317418 A1* | 12/2012 | Brundridge | G06F 21/10 | 713/176 |
| 2013/0185197 A1* | 7/2013 | Brown | G06F 21/105 | 705/39 |
| 2013/0318343 A1* | 11/2013 | Bjarnason | H04L 41/0809 | 713/157 |
| 2014/0044265 A1* | 2/2014 | Kocher | G06F 21/71 | 380/277 |
| 2014/0090051 A1* | 3/2014 | Brundridge | G06F 21/105 | 726/17 |
| 2014/0165053 A1* | 6/2014 | Escobar-Olmos | G06F 8/60 | 717/178 |
| 2014/0317720 A1* | 10/2014 | Johnson | H04L 63/02 | 726/14 |
| 2015/0188707 A1* | 7/2015 | Gehrer | H04L 9/3006 | 380/30 |
| 2015/0242620 A1* | 8/2015 | Newell | G06F 21/76 | 726/30 |
| 2016/0127133 A1* | 5/2016 | Pinder | H04L 9/3265 | 713/176 |
| 2016/0203302 A1* | 7/2016 | Huscroft | G06F 21/105 | 726/29 |
| 2016/0232334 A1* | 8/2016 | Kosovan | G06F 21/105 | |
| 2017/0091458 A1* | 3/2017 | Gupta | G06F 21/76 | |
| 2017/0187525 A1* | 6/2017 | Rosenquist | H04L 9/0861 | |
| 2017/0235928 A1* | 8/2017 | Desai | G06F 21/572 | 713/2 |
| 2017/0255762 A1* | 9/2017 | Kosovan | H04L 63/12 | |
| 2017/0257369 A1* | 9/2017 | Ito | G06F 21/76 | |
| 2017/0346807 A1* | 11/2017 | Blasi | H04L 63/0807 | |
| 2018/0196965 A1* | 7/2018 | Torres | G06F 21/105 | |
| 2019/0007202 A1* | 1/2019 | Colombo | H04L 9/14 | |
| 2019/0007212 A1* | 1/2019 | Neve de Mevergnies | H04L 9/3228 | |
| 2019/0042707 A1* | 2/2019 | Young | G06F 21/604 | |
| 2019/0052466 A1* | 2/2019 | Bettger | H04L 63/123 | |
| 2019/0318063 A1* | 10/2019 | Wierzba | G06F 21/645 | |
| 2019/0392117 A1* | 12/2019 | Viswanathan | G06F 21/606 | |
| 2020/0026825 A1* | 1/2020 | Povey | G06F 21/34 | |
| 2020/0076624 A1* | 3/2020 | Cambou | H04L 9/0861 | |
| 2020/0084042 A1* | 3/2020 | Nelson | H04L 9/30 | |
| 2020/0097658 A1* | 3/2020 | Samuel | G06F 11/0793 | |
| 2020/0134163 A1* | 4/2020 | Courtney | H04L 9/3247 | |
| 2020/0293635 A1* | 9/2020 | Martin | H04L 9/3247 | |
| 2020/0293636 A1* | 9/2020 | Martin | H04L 9/3073 | |
| 2020/0293694 A1* | 9/2020 | Gonzalez Mendez | G06F 21/575 | |
| 2021/0012445 A1* | 1/2021 | Bartfai-Walcott | H04L 9/3268 | |
| 2021/0014217 A1* | 1/2021 | Wei | H04L 63/0823 | |
| 2021/0056179 A1* | 2/2021 | Hiratsuka | G06F 21/105 | |
| 2021/0105133 A1* | 4/2021 | Wang | H04L 9/0637 | |
| 2021/0124812 A1* | 4/2021 | Stolbikov | H04L 9/3218 | |
| 2022/0067127 A1* | 3/2022 | Covolato | G06F 21/602 | |
| 2023/0105413 A1* | 4/2023 | Butcher | G06F 13/4022 | 710/104 |
| 2023/0106828 A1* | 4/2023 | Butcher | G06F 13/405 | 710/305 |

\* cited by examiner

HARDWARE LICENSE VERIFICATION

BACKGROUND

Hardware-based features or functions of a networking device may be performed outside of a central processing unit (CPU) by one or more integrated circuits. Use of some hardware-based features are subject to government regulations. For example, Media Access Control security (MACsec) and Internet Protocol Security (IPsec) are classified as restricted encryption under Export Control Classification Number 5D002 of the U.S. Export Administration Regulations (15 C.F.R. § 730 et seq).

Activation of restricted features may be controlled using a license. A networking device can check a license and activate a feature when the license is valid. Typically, license verification and activation of hardware-based features take place in the operating system of the networking device. However, license verification may be bypassed by booting up a third-party operating system that does not perform license verification.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

Figure 1:
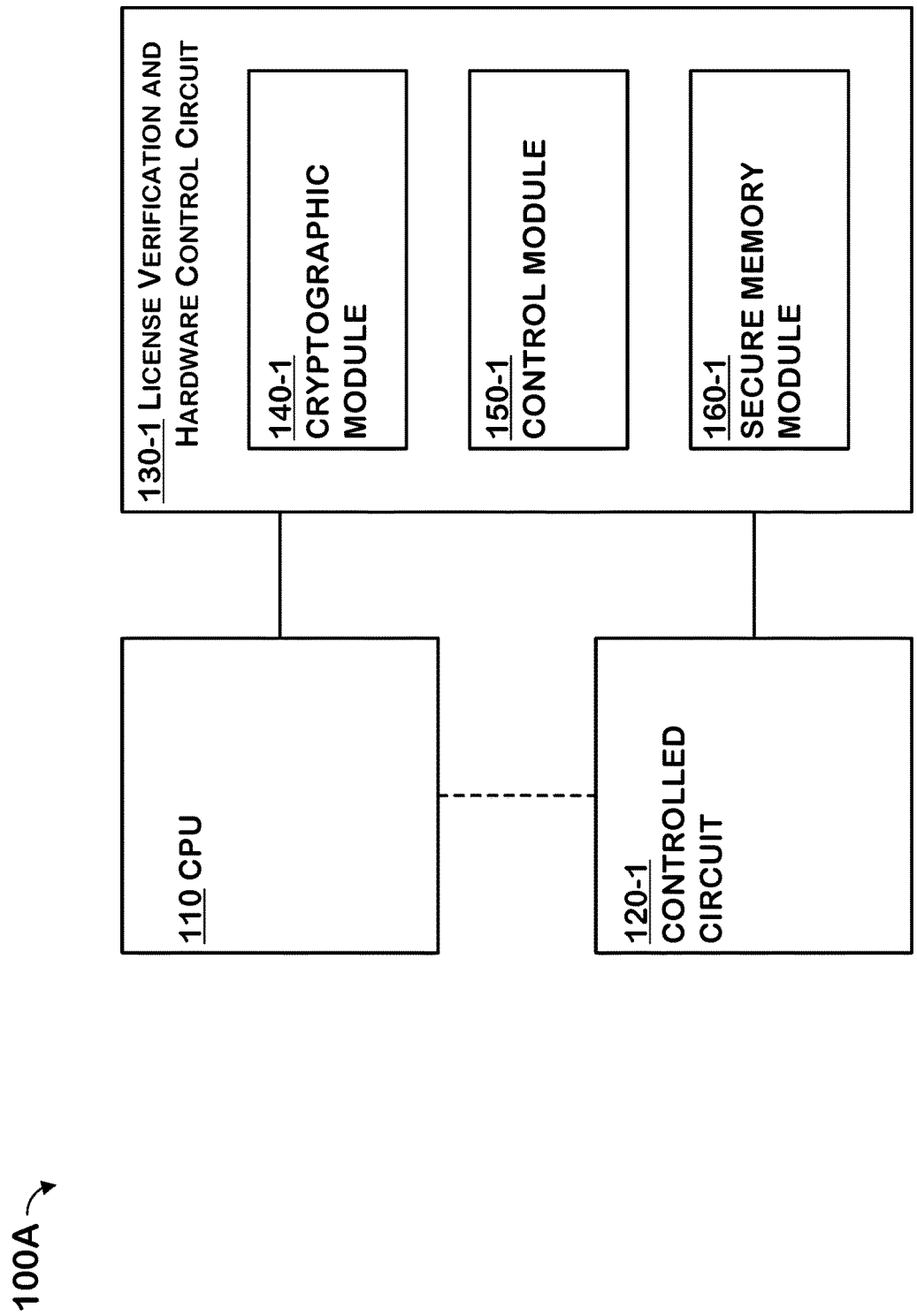
FIG. 1 illustrates an example system block diagram.

The present disclosure describes systems and techniques for secure hardware license verification and feature activation/de-activation. Typically, license verification to activate hardware-based features or functions in a networking device is performed by the operating system (OS). Performing license verification in the OS is vulnerable, because it can be bypassed by booting up a third-party OS that does not perform license verification. The present disclosure provides license verification using hardware verification circuitry, instead of using the OS or a system central processing unit (CPU). The verification circuitry can comprise various combinations of control logic, cryptographic logic, and memory. The verification circuitry is designed such that the system serial number and a public encryption key cannot be altered by the CPU or OS. For example, the CPU cannot write to the memory storing this information, the CPU is not in a data path between the control logic and memory when this information is read, and the CPU does not enable/disable the circuit implementing the feature.

Signing a license may include generating a license signature. The license may include, for example, a feature identifier, customer name, and serial number of the device—referred to as license information. The steps to sign the license may comprise: hashing the license information and encrypting the hash with a private encryption key. So, the license signature may be an encrypted hash of the license information. The hash produced when the license is signed will be referred to as the first hash.

Verifying the license in the switch may begin when the CPU provides the feature identifier, customer name, and license signature to the verification circuitry. Because the OS can be compromised (e.g., hacked or simply replaced by another OS), a serial number that is received from the OS may not be trusted. Accordingly, the verification circuitry may obtain the serial number from a secure memory that cannot be written to by the OS. The verification circuitry hashes the license information (e.g., feature identifier, customer name, and serial number). The hash produced for verifying the license will be referred to as the second hash. To verify the license, the verification circuitry decrypts the license signature using the public key and recovers the first hash. The verification is successful when the first hash and the second hash match (are the same), after which the verification circuitry can interact with the circuit that provides the licensed feature to enable/activate the feature.

The licensed features may be tied to or otherwise associated with the networking device's serial number. The present technology uses verification and control circuitry that is separate from the CPU and therefore cannot be influenced by the CPU. The present technology further includes a secure memory that stores the serial number and the serial number cannot be written by the CPU. In addition, the present technology uses verification and control circuitry that enables/disables the circuit performing the feature. The CPU (and OS) do not enable/disable the circuit performing the feature, the verification and control circuitry does. Verification can therefore be performed to enable features in the circuit without relying on the CPU or OS.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

System Architecture

FIG. 1 illustrates example system 100A according to some embodiments. System 100A may be in a networking device, such as a network switch. System 100A may comprise central processing unit (CPU) 110, controlled circuit 120-1, and license verification circuit 130-1. CPU 110 and networking devices are described further in FIG. 9. Licenses are verified to unlock operations performed by controlled circuit 120-1. When authorized by a license, controlled circuit 120-1 performs features or functions, such as Media Access Control security (MACsec) and Internet Protocol Security (IPsec). Controlled circuit 120-1 may be an integrated circuit, such as an application-specific integrated circuit (ASIC), application-specific standard part (ASSP), or System-on-Chip (SoC).

License verification and hardware control circuit 130-1 validates licenses and manages controlled circuit 120-1 to enable/disable features or functions of controlled circuit 120-1. License verification and hardware control circuit 130-1 may include cryptographic module 140-1, control module 150-1, and secure memory module 160-1. Cryptographic module 140-1 is a circuit which performs cryptographic operations, such as encryption, decryption, and comparing (verifying) cryptographic keys. Cryptographic module 140-1 may be implemented in a field programmable gate array (FPGA) or application-specific integrated circuit (ASIC). Alternatively, cryptographic module 140-1 may be a secure enclave or trusted platform module (TPM).

Control module 150-1 manages license verification and feature control. For example, control module 150-1 may instruct cryptographic module 140-1 to generate, store, and compare (verify) cryptographic keys. Control module 150-1 may also communicate with controlled circuit 120-1 to enable/disable features or operations of controlled circuit 120-1. Control module 150-1 may be an FPGA, microcontroller or system-on-chip (SoC), and the like.

Secure memory module 160-1 may store unique identifying information for the networking device (of which secure memory module 160-1 is a part), such as a serial number. Advantageously, CPU 110 cannot write the unique identifying information stored in secure memory module 160-1 or, in some embodiments, to secure memory module 160-1 generally, so the identifying information cannot be spoofed. For example, control module 150-1 can control write enable inputs of secure memory module 160-1 to prevent write operations by CPU 110. Otherwise, one leaked license could potentially be applied to multiple networking devices by loading the same serial number into the networking devices. Secure memory module 160-1 may be a non-volatile memory, such as an electrically erasable programmable read-only memory (EEPROM or E$^2$PROM), flash memory, secure enclave, or the like.

Cryptographic module 140-1, control module 150-1, and secure memory module 160-1 may be separate circuits. Alternatively, combinations of cryptographic module 140-1, control module 150-1, and secure memory module 160-1 may be combined in one FPGA, ASIC, microcontroller or SoC, and the like. License verification and hardware control circuit 130-1 (e.g., control module 150-1) communicates with CPU 110 over a bus, such as Peripheral Component Interconnect Express (PCIe or PCI Express). Communication between license verification and hardware control circuit 130-1 (e.g., control module 150-1) and controlled circuit 120-1 is described in FIG. 7.

Workflow for Verifying a License

Figure 2:
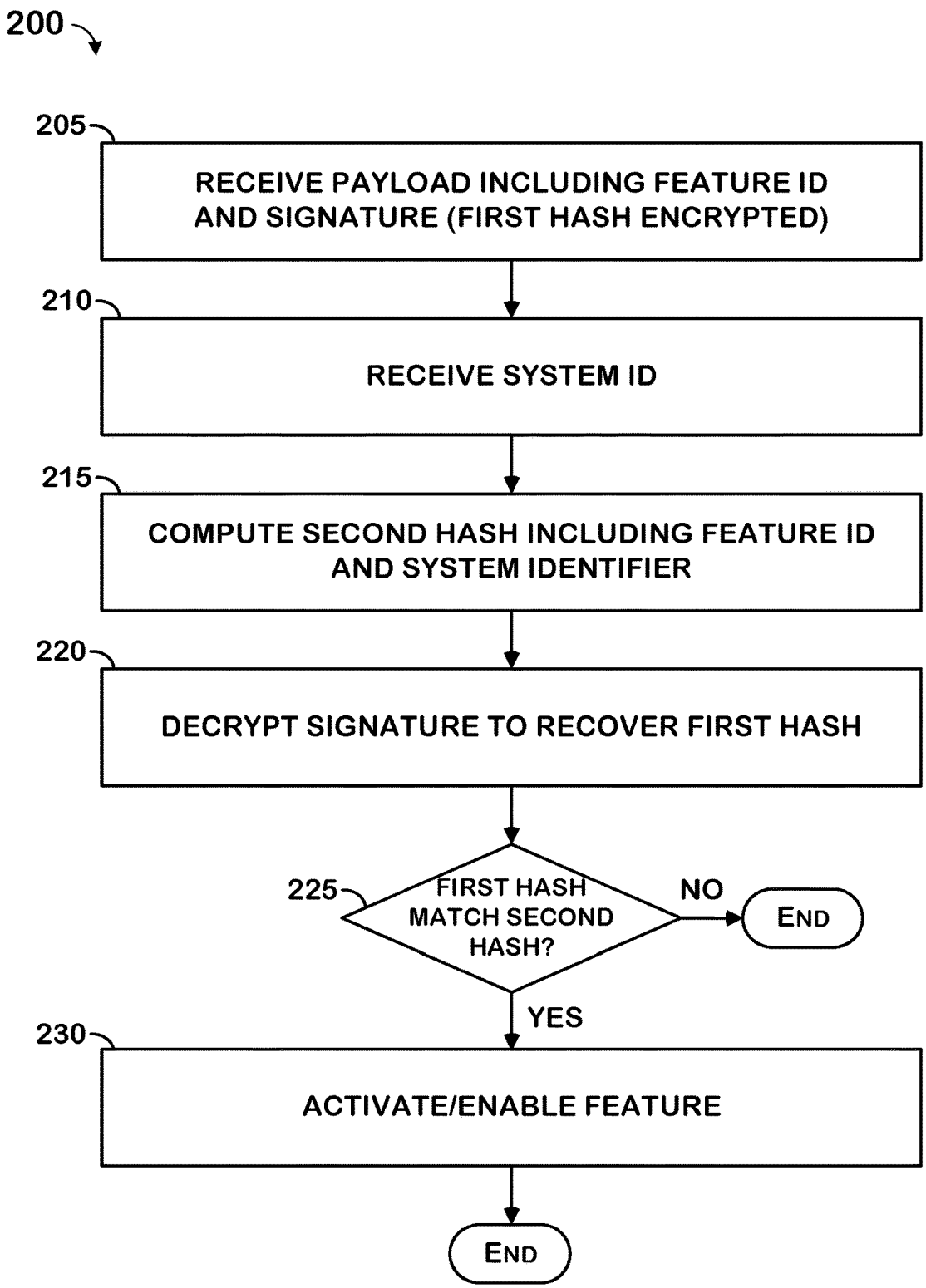
FIG. 2 illustrates a flow diagram of an example method for hardware license verification.

FIG. 2 illustrates workflow 200 for verifying a hardware license. Workflow 200 may be performed by license verification and hardware control circuit 130-1 in system 100A. When workflow 200 begins, controlled circuit 120-1 may be in a disabled/deactivated state. If workflow 200 is interrupted (or ends without performing step 230), then controlled circuit 120-1 may remain in a disabled/deactivated state. Workflow 200 may commence at step 205, where a control module 150-1 receives a payload and payload signature from CPU 110. A payload may include license information, such as a feature ID and optionally a system ID. As described in FIG. 5, the payload may contain additional information. A feature ID indicates which feature (circuit) is unlocked by the license. While a system ID, such as a serial number for the system, may be provided by CPU 110, it is not trusted to prevent spoofing.

The payload signature is an encrypted version of the hashed payload, which will be referred to as the encrypted first hash. The hashed payload was encrypted using a private encryption key. Non-limiting examples of encryption algorithms that may be used include elliptic-curve cryptography (e.g., Elliptic Curve Digital Signature Algorithm P-256 or other curve), Rivest-Shamir-Adleman (RSA), and the like. The hashed payload is the result of applying a hash function to the payload. A hash function is a function that maps data of an arbitrary size to fixed-size values. The result of applying a hash function is referred to as a hash value, hash code, or hash. Non-limiting examples of hash functions that may be used include Secure Hash Algorithms (e.g., SHA-1, SHA-2 (SHA-256, SHA-512), and the like).

At step 210, control module 150-1 may receive the system ID from secure memory module 160-1. For example, control module 150-1 may read the system ID from secure memory module 160-1. In contrast to CPU 110 (which may spoof the system ID), secure memory module 160-1 is a trusted source. At step 215, control module 150-1 may request cryptographic module 140-1 to produce a hash (referred to as the second hash) of the payload, including the feature ID (from CPU 110-1) and system ID (from secure memory module 160-1).

At step 220, control module 150-1 may request cryptographic module 140-1 to decrypt the payload signature to recover the first hash. Decryption may use a public key paired with the private key used to encrypt the payload. Here, the public key is called the license verification key (LVK). The LVK may be stored in control module 150-1. When control module 150-1 is an FPGA, for example, the LVK can be stored in registers or memory inside the FPGA. By way of further non-limiting example, when control module 150-1 is a processor, microcontroller, or SoC, the LVK can be stored in an on-chip read-only memory (ROM), secure enclave, and the like. Recall that the first hash is a hash of the payload. At step 225, the first hash (recovered from the payload signature) is compared to the second hash (generated using information in the payload from CPU 110 and from secure memory module 160-1).

When the first hash and the second hash do not match (they are not the same), then workflow 200 ends. When the first hash and the second hash match (they are the same), the license is said to be verified/validated and workflow 200 proceeds to step 230. At step 230, control module activates/enables controlled circuit 120-1. Here, controlled circuit 120-1 performs the feature/function indicated by the feature ID. For example, control module communicates with controlled circuit 120-1 to enable a feature/function of controlled circuit 120-1.

System Architecture II

Figure 3A:
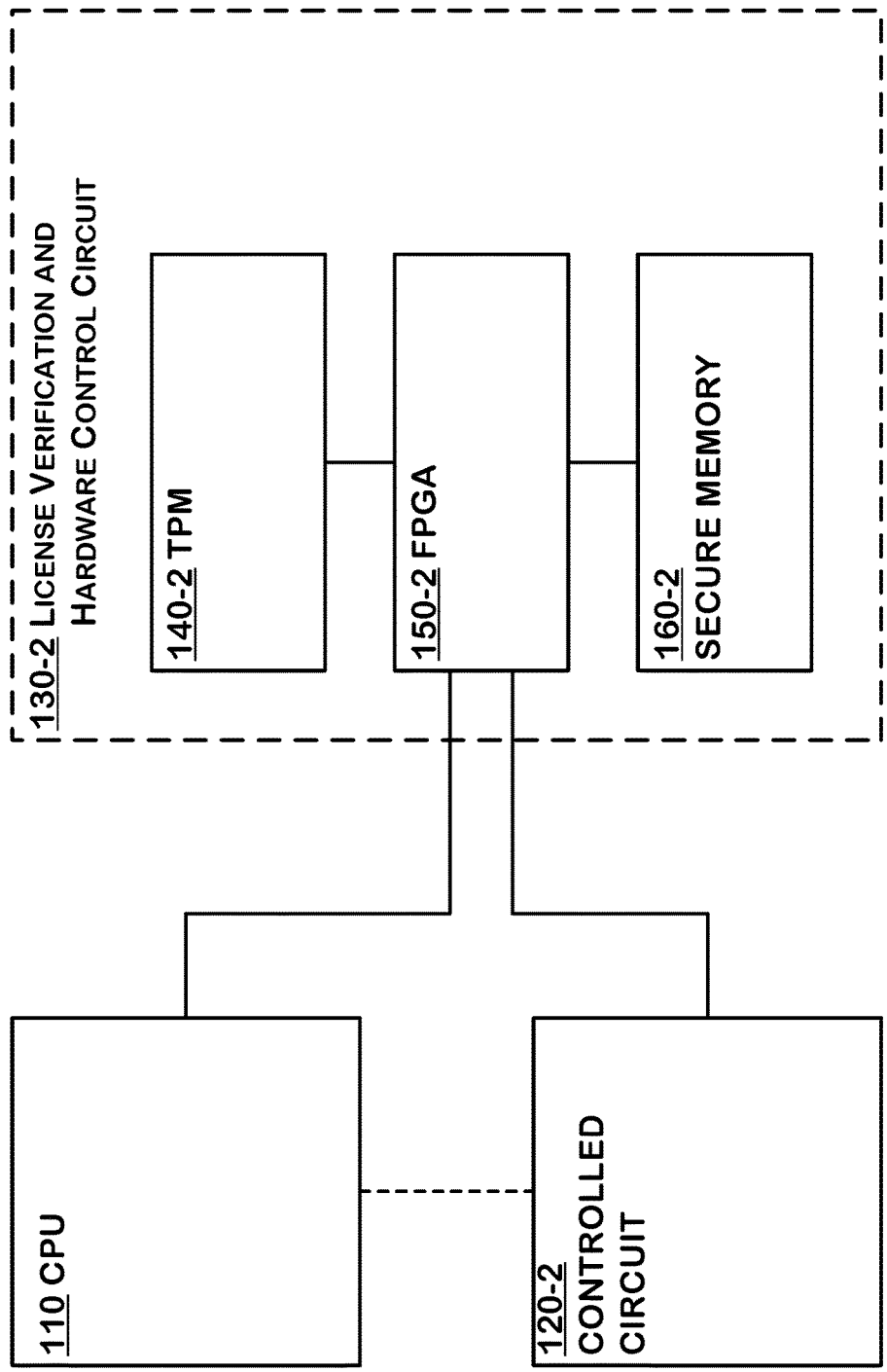
FIGS. 3A and 3B illustrate another example system block diagram.

FIG. 3A depicts system 100B, which is an example of system 100A according to various embodiments. License verification and hardware control circuit 130-2 includes trusted platform module (TPM) 140-2, FPGA 150-2, and secure memory 160-2. Here, TPM 140-2 serves as the cryptographic module and FPGA 150-2 serves as the control module. TPMs and secure memory were described in FIG. 1.

FPGA 150-2 may use static random-access memory (SRAM) to store configuration data. Since SRAM is volatile and does not retain data without power, FPGA 150-2 is configured (programmed) upon power-up. Configuration data may be stored in a non-volatile memory (referred to as a configuration (non-volatile) memory) that may be internal or external to FPGA 150-2. An external configuration memory may both store configuration data and serve as secure memory 160-2. Alternatively, secure memory 160-2 may be a non-volatile memory as described in FIG. 1. In either case, FPGA 150-2 may prevent CPU 110 (and the OS running on CPU 110) from altering the system ID.

When system 100B starts up, TPM 140-2 may be initialized by CPU 110 (and the OS running on CPU 110). When FPGA 150-2 is performing license verification and hardware control operations (e.g., FIGS. 4A and 4B), FPGA 150-2 may prevent CPU 110 from communicating with TPM 140-2. In addition to performing control functions for license verification and hardware control (referred to as license verification mode), FPGA 150-2 may perform other functions in the networking device (referred to as regular operating mode). For example, FPGA 150-2 may manage peripherals (e.g., temperature sensors) and power in regular operating mode.

Figure 3B:
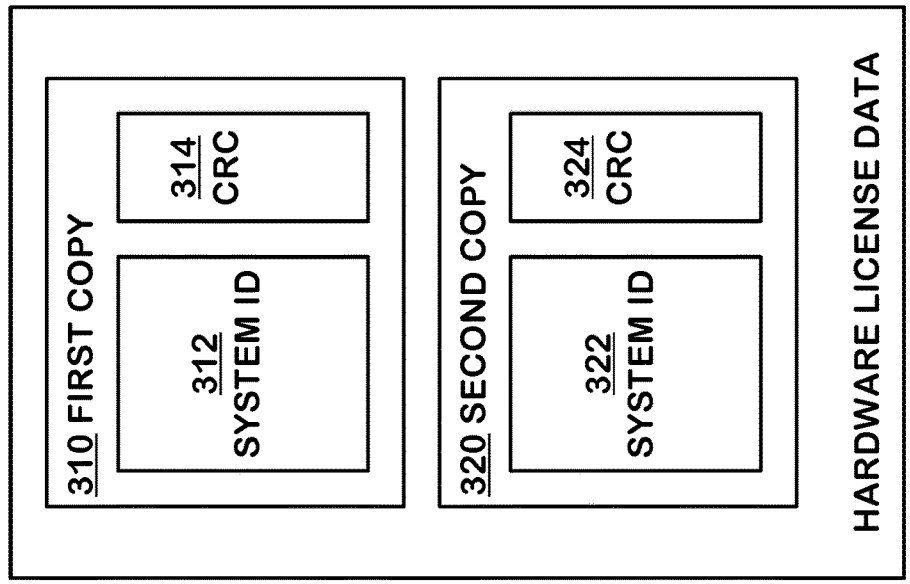

FIG. 3B depicts secure memory 160-3, which is an example of secure memory 160-1 and 160-2. Recall that the secure memory stores a system ID, such as a serial number. For example, the system ID may be a 32-byte string of American Standard Code for Information Interchange (ASCII) characters. Other lengths, such as 64 bytes and 128 bytes may be used. When the network device's actual system ID is less than the system ID length, the actual system ID may be padded (e.g., with "0" s) to fit the system ID length.

Check data (also referred to as check values) (e.g., CRC 314 and 324) from an error-detecting code (e.g., cyclic redundancy check (CRC) 324) may also be stored in secure memory 160-3 to help detect when the system ID (e.g., System ID 312 and 322) is corrupted or tampered with. In addition, secure memory 160-3 may store one or more redundant copies (e.g., first copy 310 and second copy 320), so FPGA 150-2 can recover from a corrupted copy.

Workflow for Verifying a License II

Figure 4A:
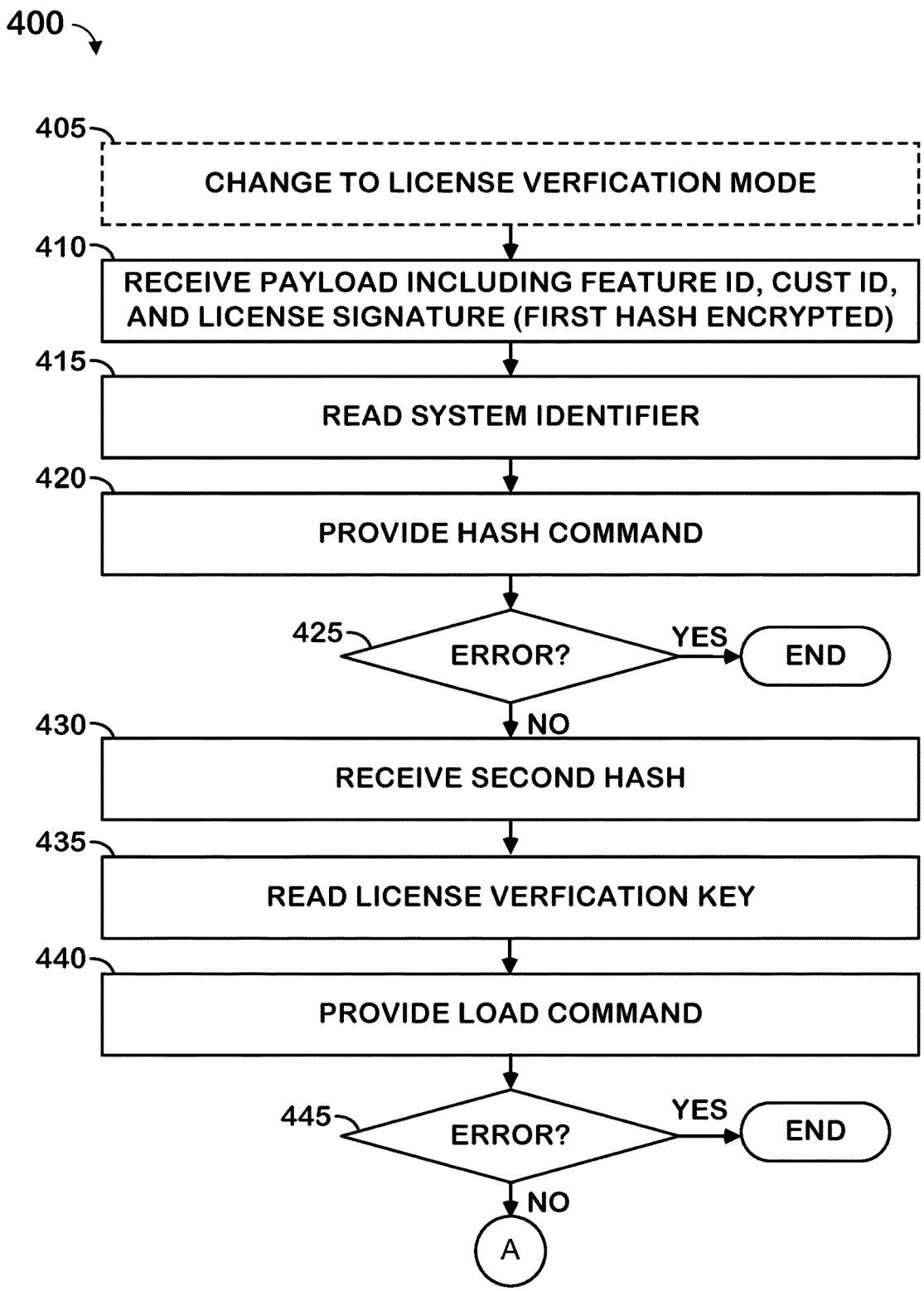
FIGS. 4A and 4B illustrate another example method for hardware license verification.
Figure 4B:
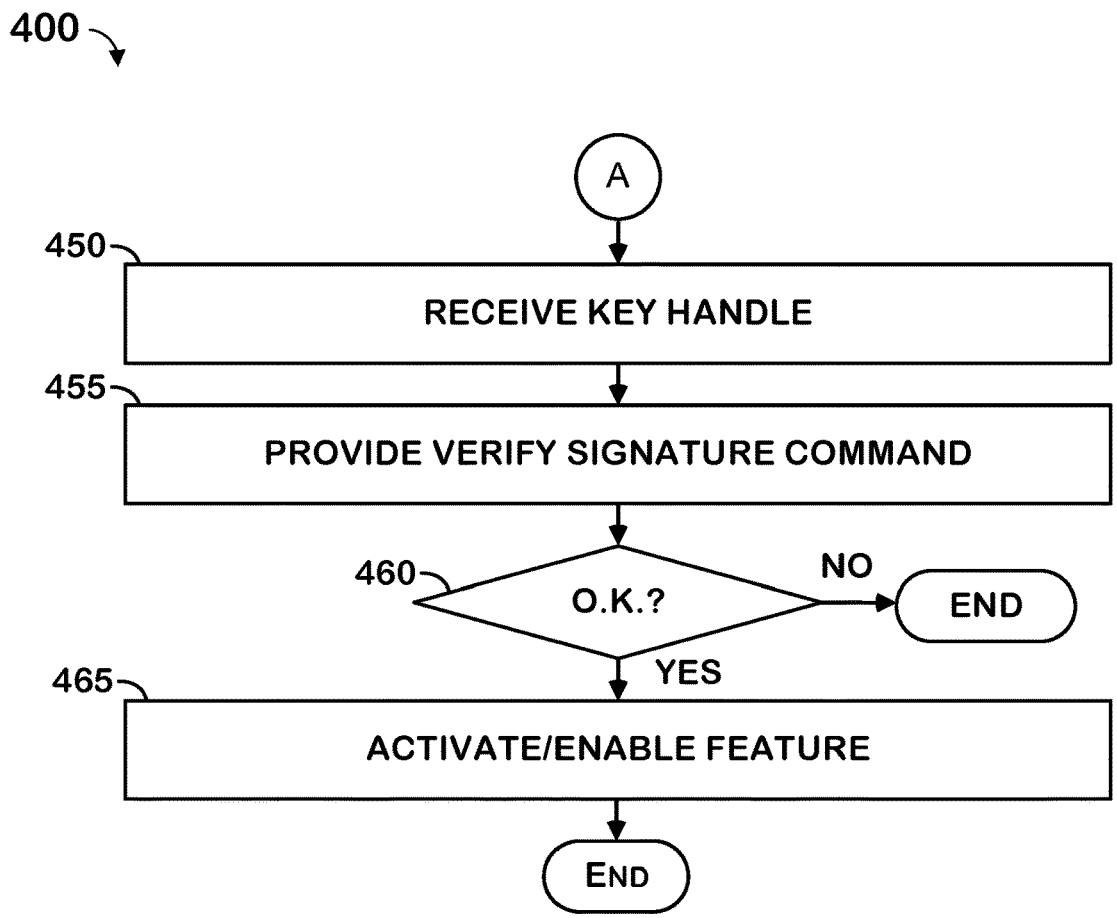

FIGS. 4A and 4B depict workflow 400 for verifying a hardware license. Workflow 400 is an example of workflow 200, according to some embodiments. Workflow 400 may be performed by license verification and hardware control circuit 130-2. When workflow 400 begins, controlled circuit 120-2 may be in a deactivated/disabled state. If workflow 400 is interrupted (or ends without performing step 465), then controlled circuit 120-2 may remain in a deactivated/disabled state. Workflow 400 may commence at step 405, where FPGA 150-2 may optionally change to license verification mode. For example, CPU 110 (and the OS running on CPU 110) may switch FPGA 150-2 to license verification mode.

Figure 5:
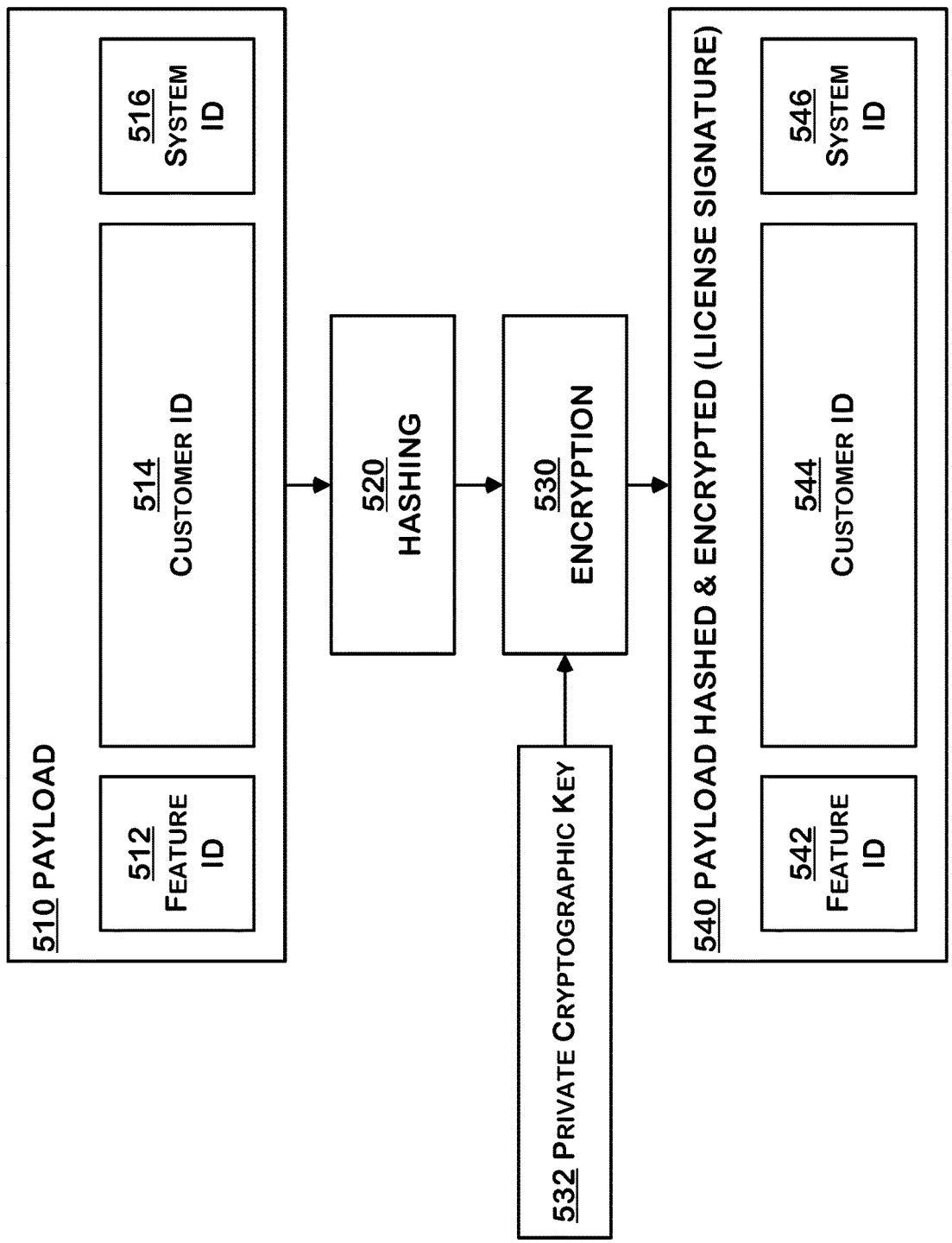
FIG. 5 illustrates an example of payload data.

Once CPU 110 switches FPGA 150-2 to license verification mode, FPGA 150-2 may receive license information (also referred to as a payload) from CPU 110 (step 410). A license may typically be text (ASCII characters). For example, FIG. 5 shows payload 510. Payload 520 may include feature ID 512, customer ID 514, and system ID 516. Payload 520 may include more license information (e.g., start date/time, an expiration (e.g., valid until) date/time, other system information, and the like) or less license information. CPU 110 is not required to send system ID 516, because it may be spoofed.

Feature ID 512 represents the feature to activate/enable. For example, feature ID 512 may be 2 bytes (binary number) long and identify a feature such as MACsec or IPsec. Customer ID 514 represents a particular customer (e.g., purchaser, owner, operator, etc. of the network device). For example, customer ID 514 may be 256 bytes (ASCII characters) long. When the actual customer ID is shorter than the length of customer ID 514, the actual customer ID may be padded (e.g., with "0"s) to fit the customer ID length. System ID 516 represents the networking device the license is for and may be a serial number. For example, system ID 516 may be an ASCII string 32 bytes (ASCII character) long. When the actual system ID is less than the length of system ID 516, the actual system ID may be padded (e.g., with "0"s) to fit the system ID length.

Turning back to FIGS. 4A and 4B, FPGA 150-2 receives system ID 516 (step 415). For example, FPGA 150-2 reads system ID 516 from secure memory 160-2. Again, secure memory 160-2 as a source of system ID 516 is trusted over CPU 110, because CPU 110 may spoof system ID 516.

Figure 6:
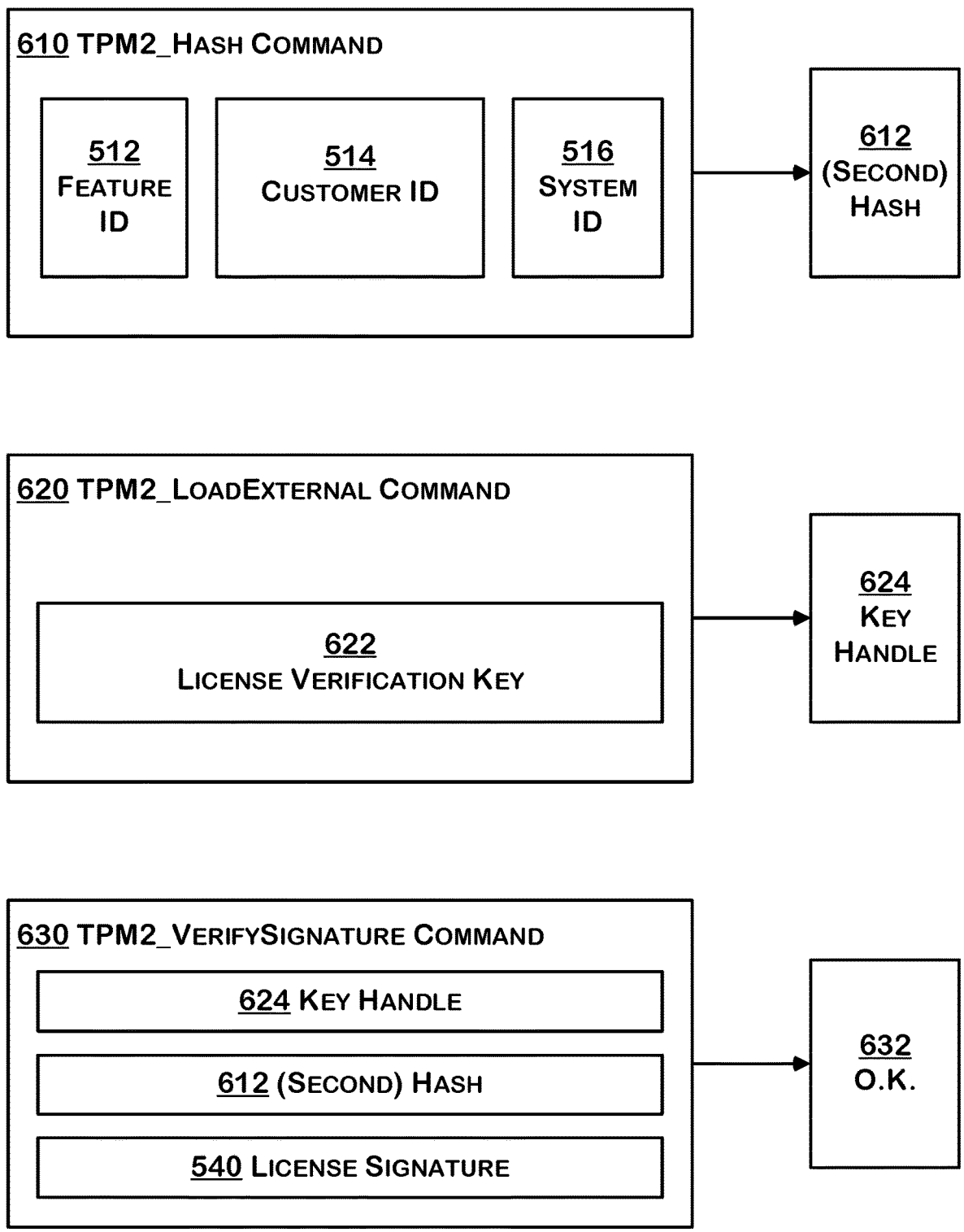
FIG. 6 illustrates examples of encryption module commands.

At step 420, FPGA 150-2 sends a request to TPM 140-2 to hash feature ID 512 (from CPU 110), customer ID 514 (from CPU 110), and system ID 516 (from secure memory 160-2). The payload here is purely illustrative, and additional or fewer licensing information may be hashed. FIG. 6 shows a sample request to hash feature ID 512, customer ID 514, and system ID 516 in TPM2_Hash_Command 610.

At step 425 when TPM 140-2 returns an error code, workflow 400 ends. For example, FPGA 150-2 may pass the error code to CPU 110 (and the OS that runs on CPU 110) for error handling. When TPM 140-2 does not return an error (and instead returns second hash 612), FPGA 150-2 receives second hash 612 (step 430).

At step 435, FPGA 150-2 reads license verification key (LVK) 622. FPGA 150-2 internally stores LVK 622. For example, FPGA 150-2 stores system LVK 622 in its own memory resources (e.g., registers, embedded memory blocks, and the like). FPGA 150-2's configuration data may include LVK 622 so that the memory resources are programmed with LVK 622 whenever FPGA 150-2 is configured (e.g., on power up).

At step 440, FPGA 150-2 requests TPM 140-2 to store LVK 622 in TPM 140-2. FIG. 6 shows example TPM2_LoadExternal Command 620. At step 445 when TPM 140-2 returns an error code, workflow 400 ends. Here again, FPGA 150-2 may pass the error code to CPU 110 (and the OS that runs on CPU 110) for error handling. When TPM 140-2 does not return an error code (and instead returns key handle 624), FPGA 150-2 receives key handle 624 (step 450).

At step 455, FPGA 150-2 requests TPM 140-2 to verify license signature 540 (received from CPU 110 along with payload 510). FIG. 6 shows example TPM2_VerifySignature command 630. TPM 140-2 may decrypt license signature 540 using LVK 622 (which was stored in TPM 140-2 under key handle 624) to produce the first hash. As shown in FIG. 5, the first hash is payload 510 after applying hashing function 520. License signature 540 is payload 510 after applying hashing function 520 and encryption algorithm 530 with private cryptographic key 532. For example, license signature 540 includes encrypted feature ID 542, customer ID 544, and system ID 546. Note that TPM 140-2 identifies the cryptographic keys that it stores using key handles, such as key handle 624 corresponding to LVK 622.

When TPM 140-2 determines that first hash and the second hash do not match (they are not the same) (step 460), TPM 140-2 returns an error code. When TPM 140-2 determines that first hash and the second hash match (they are the same) (step 460), TPM 140-2 returns an O.K. code. When TPM 140-2 returns an error code, workflow 400 ends. As before, FPGA 150-2 may pass the error code to CPU 110 (and the OS that runs on CPU 110) for error handling. When TPM 140-2 does not return an error code (and instead returns an O.K. indication 632), FPGA 150-2 proceeds to step 465. At step 465, FPGA 150-2 activates/enables the feature/function in controlled circuit 120-2.

Hardware Feature Control

Figure 7:
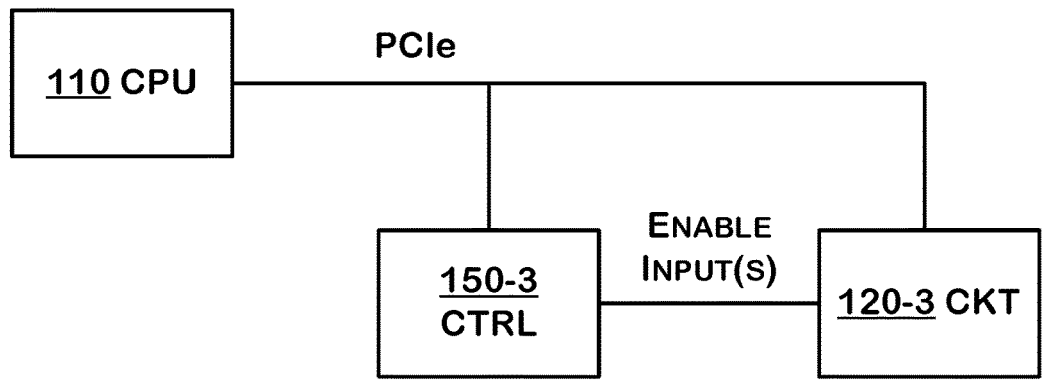
FIG. 7 illustrates examples of hardware control.
Figure 7:
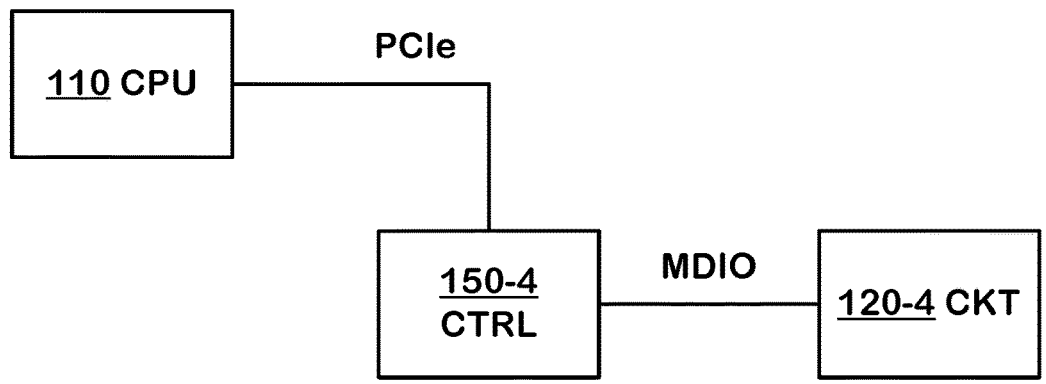
Figure 7:
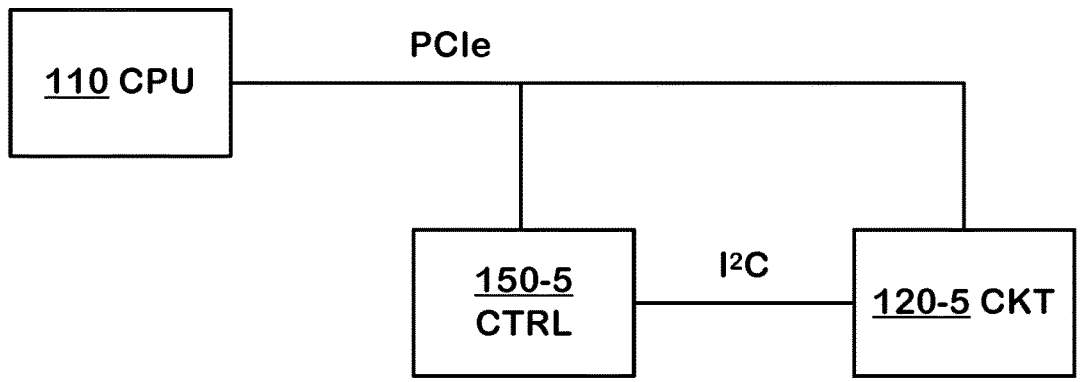

FIG. 7 illustrates example systems 700A-700C for controlling hardware features. The examples depicted in FIG. 7 may be used individually and in combination. Systems 700A-700C are examples of systems 100A and 100B. A controlled circuit (e.g., controlled circuits 120-3, 120-4, and 120-5) may provide more than one feature. When a feature of a controlled circuit is deactivated/disabled, CPU 110 (and the OS running on CPU 110) may not configure or use that feature. For example, configuration or use of the feature will be ignored/blocked by the controlled circuit. An activated feature and regular operations (e.g., handling regular network traffic) may not be affected by a deactivated/disabled feature.

In system 700A, controlled circuit 120-3 includes an enable input (or enable inputs). The enable input may enable and disable a feature of controlled circuit 120-3. For example, controlled circuit 120-3 may provide multiple features, each one controlled (enabled/disabled) by a corresponding enable input. An output (or outputs) of control module 150-3 can drive the enable input(s) of controlled circuit 120-3 to enable/disable corresponding features of controlled circuit 120-3.

In system 700B, control module 150-4 may access internal registers of controlled circuit 120-4 through a management data input/output (MDIO) bus. Control module 150-4 may disable access to an MDIO address range corresponding to internal registers critical to the operation of controlled circuit 120-4. In this way, control module 150-4 may prevent controlled circuit 120-4 from operating properly, effectively disabling it. When control module 150-4 does not interfere with controlled circuit 120-4, controlled circuit 120-4 may operate normally.

In system 700C, control module 150-5 may access internal registers of controlled circuit 120-5 through an Inter-Integrated Circuit (I$^2$C) bus. For example, control module 150-5 may write to internal registers critical to the operation of controlled circuit 120-5. In this way, control module 150-5 may prevent controlled circuit 120-5 from operating properly, effectively disabling it. When control module 150-5 does not interfere with controlled circuit 120-5, controlled circuit 120-5 may operate normally.

By way of further non-limiting example, the control module (e.g., control module 150-4 and 150-5) may disable the controlled circuit (e.g., controlled circuit 120-4 and 120-5) by writing to the controlled circuit's internal registers which enable/disable operation of the controlled circuit. This may be performed when the network device is powered on, reset, and the like. Periodically thereafter, the control module may check to see if the controlled circuit has been enabled (e.g., by CPU 110 and the OS running on CPU 110) by reading the controlled circuit's internal registers. The control module may read and write the controlled circuits internal registers, for example, through an MDIO bus (e.g., system 770B), I$^2$C bus (e.g., system 700C), and the like. In system 100B, FPGA 150-2 may perform these operations in regular operating mode.

Unauthorized operation of the controlled circuit (e.g., controlled circuit 120-4 and 120-5) may be detected when the controlled circuit is enabled but a license check was not performed or passed. The controlled circuit may be tampered with by software/scripts run on CPU 110 to get around the control module's (e.g., control module 150-4 and 150-5) management. When unauthorized use—a license violation—is detected, the control module may deactivate/disable the controlled circuit (again) by writing to the internal registers. However, in the time between the tampering and the disabling, the controlled circuit may be intermittently used (e.g., for on the order of 1 second at a time).

To limit the utility of unauthorized activation of the controlled circuit (e.g., controlled circuit 120-4 and 120-5), the control module (e.g., control module 150-4 and 150-5) may cause the networking device (e.g., system 100A, 100B, 700A, 700B, and 700C) to reboot/restart. For example, the control module may (repeatedly) reset the controlled circuit by writing to its internal registers. CPU 110 may detect the reset state of the controlled circuit, and reset the FPGA, reboot the system, and the like. Rebooting/restarting the networking device can take on the order of 10 minutes. Although the controlled circuit may be used for a short time (e.g., ~1 second), it takes much longer (e.g., ~10 minutes) to recover from a license violation. This severely restricts any benefit derived from unauthorized use. In system 100B, FPGA 150-2 may perform these operations in regular operating mode.

When a license to enable the controlled circuit is verified, the control module may enable the controlled circuit by writing to the internal registers. In system 100B, FPGA 150-2 may perform this operation in license operating mode.

Modular Systems

Figure 8:
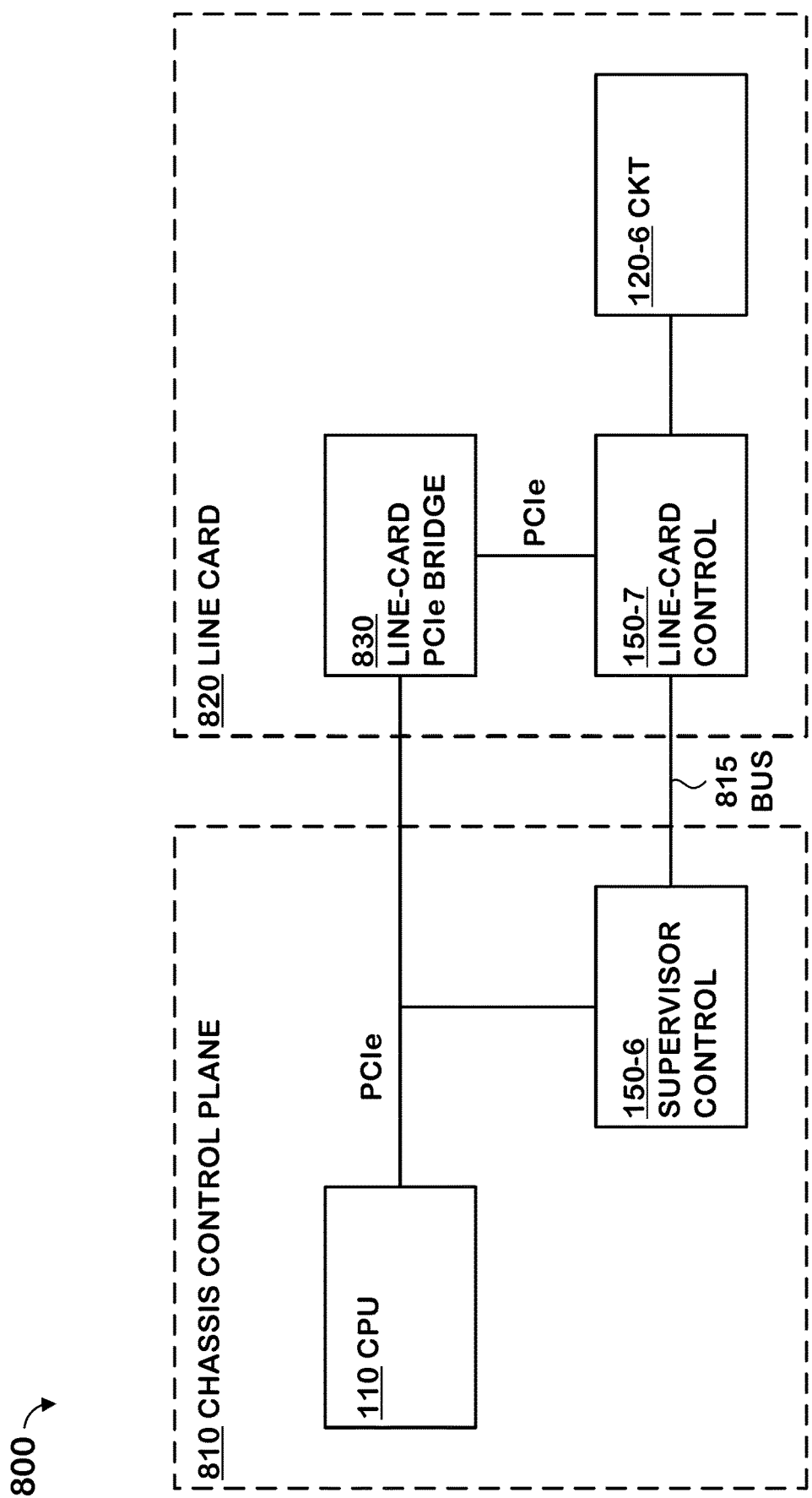
FIG. 8 illustrates a further example system block diagram.

FIG. 8 depicts example network device 800 having multiple line cards (e.g., line card 820) each with one or more controlled circuits (e.g., controlled circuit 120-6). In some embodiments, license verification (e.g., as shown in FIGS. 1, 4A, and 4B) can be performed by a control module on each line card (e.g., line-card control module 150-7). Here, the system ID may be a serial number of line card 820.

In various embodiments, a control module in the chassis control plane 810 (e.g., supervisor control module 150-6) may perform license verification using a serial number of the chassis as the system ID. When a license is verified, supervisor control module 150-6 can send an out-of-band signal to one or more of line card control modules 150-7 over bus 815 (e.g., System Management Bus (SMBus)). The out-of-band signal may instruct the line card control modules 150-7 to activate the corresponding one or more controlled circuits 120-6. When a feature is not licensed, supervisor control module 150-6 can send an out-of-band signal to one or more of line card control modules 150-7 to disable the feature performed by one or more controlled circuits 120-6.

Networking Device

Figure 9:
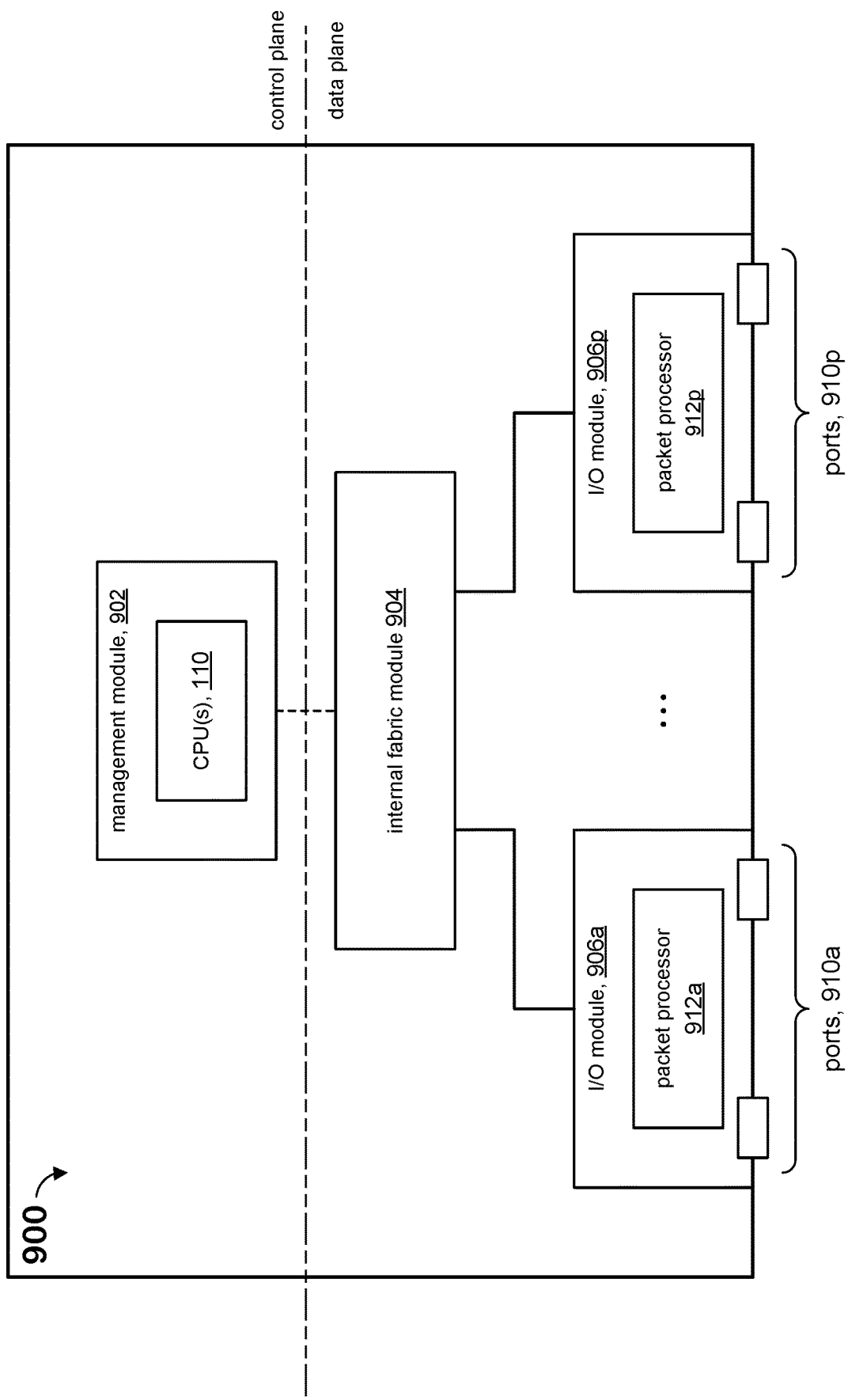
FIG. 9 shows an illustrative example of a networking device that can be adapted in accordance with the present disclosure.

FIG. 9 depicts an example of a network device 900 in accordance with some embodiments of the present disclosure. In some embodiments, network device 900 can be a switch. As shown, network device 900 includes a management module 902, an internal fabric module 904, and a number of I/O modules 906a-906p. Management module 902 includes the control plane (also referred to as control layer) of network device 900 and can include one or more management CPUs 110 for managing and controlling operation of network device 900 in accordance with the present disclosure. Each management CPU 110 can be a general purpose processor, such as an IntelNAMD® x86 or ARM® processor, that operates under the control of software stored in a memory (not shown), such as dynamic random access memory (DRAM). Control plane refers to all the functions and processes that determine which path to use, such a routing protocols, spanning tree, and the like.

Internal fabric module 904 and I/O modules 906a-906p collectively represent the data plane of network device 900 (also referred to as data layer, forwarding plane, etc.). Internal fabric module 904 is configured to interconnect the various other modules of network device 900. Each I/O module 906a-906p includes one or more input/output ports 910a-910p that are used by network device 900 to send and receive network packets. Each I/O module 906a-906p can also include a packet processor 912a-912p. Each packet processor 912a-912p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the control plane. It should be appreciated that network device 900 is illustrative and many other configurations having more or fewer components than system 900 are possible.

What is claimed is:

1. A method for performing license verification using a hardware verification circuitry in a circuit to activate hardware-based features comprising:
   receiving, from a central processing unit (CPU), a first part of a license payload and a license signature covering the license payload, the license signature being generated using a private encryption key;
   receiving a second part of the license payload from a secure memory of the circuit, the second part of the license payload comprising a unique identifier for the circuit, the CPU being prevented from modifying the second part of the license payload;
   generating a hash using the first part of the license payload and the second part of the license payload;
   verifying the license signature using the hash and a public encryption key associated with the private encryption key; and
   when the verifying is successful, communicating with a control circuitry to enable functionality of the circuit specified in the license payload.

2. The method of claim 1 wherein the verifying comprises:
   decrypting the license signature using the public encryption key to create a decrypted license signature; and
   comparing the decrypted license signature to the hash, wherein the verifying is successful when the decrypted license signature matches the hash.

3. The method of claim 1 wherein the first part of the license payload includes an identifier for the functionality of the circuit to be enabled.

4. The method of claim 1 further comprising:
   switching the circuit to a license verification mode from another operating mode.

5. The method of claim 1 wherein the control circuitry is at least one of an application-specific integrated circuit (ASIC), application-specific standard part (ASSP), and System-on-Chip (SoC).

6. The method of claim 1 wherein the enabled functionality is at least one of Media Access Control security (MACsec) and Internet Protocol Security (IPsec).

7. The method of claim 1 wherein the communicating includes at least one of controlling an enable input of the control circuitry, controlling access to a bus of the control circuitry, and writing to a plurality of registers of the control circuitry.

8. A system for performing license verification and hardware-based feature activation comprising:
   a logic circuit configured to:
      receive a first part of a license payload and a license signature covering the license payload from a central processing unit (CPU), the license signature being generated using a private encryption key,
      store a public encryption key associated with the private encryption key, and
      enable functionality of a control circuitry specified in the license payload when the license signature is verified;
   a secure memory communicatively coupled to the logic circuit, the secure memory configured to:
      store a second part of the license payload, the second part of the license payload comprising a unique identifier for the system, the central processing unit (CPU) being prevented from modifying the second part of the license payload; and
   a cryptography engine communicatively coupled to the logic circuit, the cryptography engine configured to:
      generate a hash using the first part of the license payload and the second part of the license payload, and
      verify the license signature using the hash and the public encryption key.

9. The system of claim 8 wherein the cryptography engine is a trusted platform module (TPM).

10. The system of claim 9 wherein the TPM is further configured to store the public encryption key.

11. The system of claim 8 wherein the logic circuit is a field programmable gate array (FPGA).

12. The system of claim 11 wherein the public encryption key is included in configuration data of the FPGA.

13. The system of claim 8 wherein the secure memory further stores a check value calculated using an error-detecting code and the second part of the license payload.

14. The system of claim 13 wherein the error-detecting code is a cyclic redundancy check (CRC).

15. The system of claim 14 wherein the secure memory further stores another copy of the second part of the license payload and the check value.

16. The system of claim 8 wherein a line card comprises the control circuitry specified in the license payload.

17. A network device for performing license verification comprising:
   a control module configured to:
      receive a first part of a license payload and an encrypted license signature covering the license payload from a central processing unit (CPU), and
      enable functionality of circuitry specified in the license payload when the encrypted license signature is verified;
   a secure memory communicatively coupled to the control module storing a second part of the license payload that cannot be modified by the CPU, the second part of the license payload comprising a unique identifier for the network device; and
   a cryptography engine communicatively coupled to the control module, the cryptography engine configured to verify the encrypted license signature using the first part of the license payload and the second part of the license payload.

18. The network device of claim 17 wherein the control module is further configured to disable the functionality of the circuitry when the encrypted license signature is not verified.

19. The network device of claim 17 wherein the control module is a FPGA and the cryptography engine is a TPM.

20. The network device of claim 17, wherein the CPU is not in a data path between the control module and the secure memory.

* * * * *